United States Statutory Invention Registration [19]

[11] Reg. Number: H576

Tezuka [43] Published: Feb. 7, 1989

[54] ELECTROPHERESIS APPARATUS HAVING SAFETY DEVICE

[76] Inventor: Sigeru Tezuka, c/o Fuji Photo Film Co., Ltd. No. 11-46, Senzui 3-chome, Asaka, Saitama, Japan

[21] Appl. No.: 97,619

[22] Filed: Sep. 11, 1987

[30] Foreign Application Priority Data

Sep. 11, 1986 [JP] Japan ..... 61-214882

[51] Int. Cl.[4] ..... B01D 13/02; C25D 13/00

[52] U.S. Cl. ..... 204/299 R

*Primary Examiner*—John F. Terapane
*Assistant Examiner*—Susan Wolffe
*Attorney, Agent, or Firm*—Jules E. Goldberg

[57] ABSTRACT

An electrophoresis apparatus having buffer solution vessel(s) provided with an electrode and an electrically conductive terminal and a cover for covering said vessel(s) to avoid contact with an operator's hands is disclosed. The cover is pivotably connected to the vessel so that it can rotate between a closed or covering position and an open or uncovered position. The cover has a hole therein through which the conductive terminal can be attached to a power supply plug when the cover is in the closed position but wherein the connection cannot be made when the cover is in the open position, thereby providing for operator safety.

5 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTROPHERESIS APPARATUS HAVING SAFETY DEVICE

BACKGROUND OF THE INVENTION

1. Field of the Invention

The present invention relates to an electrophoresis apparatus which is an important means for analyzing a biopolymer, such as, protein, nucleic acids, or the like, and particularly relates to an electrophoresis apparatus provided with a foolproof safety device for preventing an electric shock due to carelessness in handling an electrophoresis apparatus using high-voltage electricity.

2. Description of the Prior Art

Electrophoresis is an important means for analyzing biopolymers, such as, protein, nucleic acid, or the like, and has been widely used in the academic as well as in the industrial world. Particularly, electrophoresis has become more important in medical science in analysis of DNA and in biotechnology. Because a high voltage of not lower than 1,500 volts is used in an electrophoresis apparatus, it is desirable to provide a foolproof safety device for preventing electric shock due to carelessness. An electrophoresis apparatus provided with a safety device has been known, but it is large in size as a whole or is inconvenient in handling. For example, a known electrophoresis apparatus is provided with a cover which can cover a buffer solution vessel so that hands cannot touch the buffer solution in the vessel. The cover is arranged such that a power supply connecting cord is engaged with the cover so that the power supply plug cannot be connected to the electrophoresis apparatus when the cover is in an opened state. Such an apparatus requires care so as not to wet the cord in cleaning the apparatus and is inconvenient in handling.

SUMMARY OF THE INVENTION

We have discovered an eleotrophoresis apparatus which is of a convenient size and which simply and surely prevents electric shock from occurring due to carelessness. This is accomplished with the present invention which provides an electrophoresis apparatus having a buffer solution vessel provided with an electrode and an electrically conductive terminal, the buffer solution vessel having a cover member capable of covering the vessel so that the hands cannot touch a buffer solution therein. The cover member is provided with an opening portion through which a power supply plug can be connected to the electrically conductive terminal, the cover member being rotatable or pivotably mounted so as to cover the vessel, the power supply plug being arranged so as to be able to be connected to the electrically conductive terminal through the opening portion only when the vessel is covered by the cover member.

DESCRIPTION OF THE PREFERRED EMBODIMENTS

Figure 1:
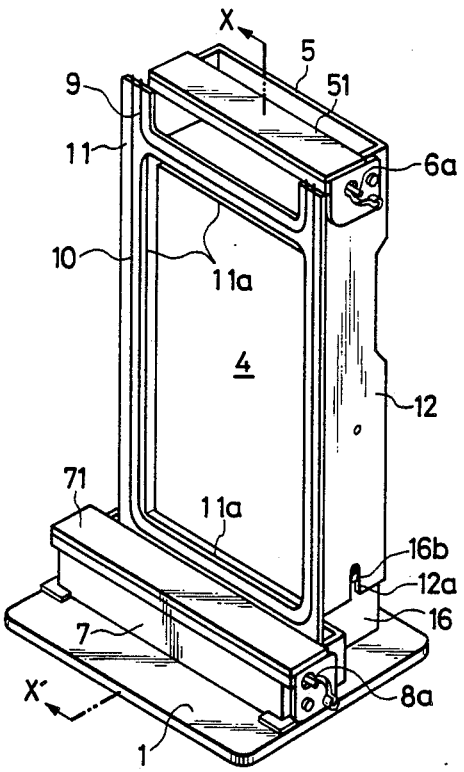
FIG. 1 is a perspective view of an embodiment of the electrophoresis apparatus according to the present invention.

Preferably, a hole is formed through the cover member in the direction parallel or substantially parallel to the rotary axis of the cover member so that the power supply plug can be passed through the hole and connected to the electrically conductive terminal only when the cover member is fully covering the vessel. Alternatively, a hole can be formed through the cover member in the direction perpendicular or substantially perpendicular to the rotary axis of the cover member so that the power supply plug can be passed through the hole so as to be connected to the electrically conductive terminal when the cover member is covering the vessel.

Particularly advantageous is an electrophoresis apparatus in which the opening portion is formed through the cover member in the direction parallel or substantially parallel to the rotary axis of the cover member and is composed of a hole having a diameter large enough for the power supply plug to pass therethrough and an arcuate slit intercepting the hole. The width of the slit is large enough for the power-receiving tip to pass but too small for the power supply plug to pass, the slit having a width less than the hole diameter. A power-receiving tip (generally, having the form of the so-called "banana" tips) can be passed through the hole and the slit. However, the power supply plug can only be passed through the hole. This embodiment provides safety from shock and is particularly helpful in voiding increases in the size of the apparatus. In cases of this type, it is preferable that the cover member is pivotably connected to the vessel and can rotate about the pivot connection between a closed position wherein the vessel is covered and an open position wherein the vessel is uncovered. It is also best if the cover cannot stop in an intermediate position between the open and closed positions. It is further preferable for safety reasons to provide a projecting portion or tip at the end of the arcuate slit most distant fom the end intersecting the hole for covering that portion of the banana tip which projects or protrudes through the slit when the cover member is in the open position.

In the electrophoresis apparatus according to the present invention, the electrophoresis component may be a horizontal type, a vertical type, or a slanting type. In many cases, the electrophoresis apparatus is provided with two buffer solution vessels. In such a case, the cover member may be provided for only one of the vessels or for each of the vessels. For complete safety, however, it is desired that all the buffer solution vessels are provided with their own cover members respectively.

Referring to the drawings, preferred embodiments of the present invention will be described hereunder.

Figure 2:
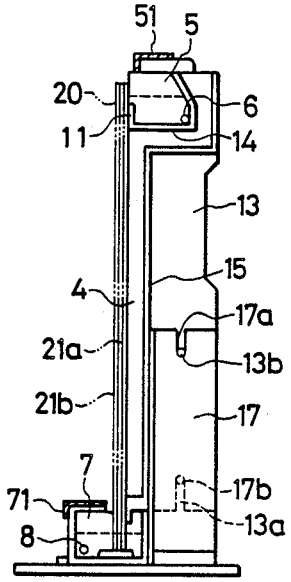
FIG. 2 is a cross-section of the electrophoresis apparatus as shown in FIG. 1 on the plane including lines X and X'.

FIG. 1 is a perspective view showing an embodiment of the electrophoresis apparatus according to the present invention and FIG. 2 is a cross-section of the same apparatus on the plane including lines X and X'. The electrophoresis apparatus is basically constituted by a support 1, a lower buffer solution tank 7, posts 16 and 17, side-surface frames 12 and 13, a front-surface frame 11*a*, an upper buffer solution vessel 5, an electrophoresis portion 20 constituted by an electrophoresis sheet and a holding member, and a heat-retaining water vessel 4. The lower and upper buffer solution vessels are respectively fixed on the support 1 and the upper ends of the side-surface frames 12 and 13, supported by the posts 16 and 17, respectively. The electrophoresis portion 20 is collectively attached at its upper end to the upper buffer solution vessel 5 and is attached at its lower ends so as to enter the lower buffer solution vessel 7. Upper and lower electrodes 6 and 8 are provided in the upper and lower buffer solution vessels 5 and 7, respectively, and are connected to respective banana tips (connection terminals) 6*a* and 6*b* projecting outwardly from the outside walls of the buffer solution vessels 5 and 7, respectively.

The upper buffer solution vessel 5 is constituted by the side-surface frames 12 and 13, a bottom plate 14, and the front-surface frame 11.

Figure 5A:
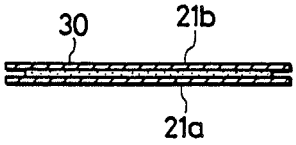
FIGS. 5*a* and 5*b* are cross-sections of a electrophoresis portion.
Figure 5B:
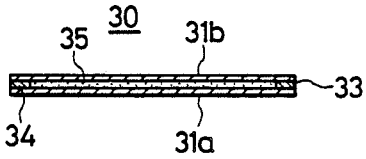

As shown in FIG. 5, the electrophoresis portion 20 is constituted by plane glass plates 21*a* and 21*b* and a gel sheet 30 sandwiched between the plane glass plates 21*a* and 21*b*. The gel sheet 30 is arranged such that an electrophoresis gel film 35 is sandwiched, together with spacers 33 and 34 provided at opposite ends of the electrophoresis gel film 35, between two non-conductive polymer films 31*a* and 31*b*. The front-surface frame 11, the glass plate 21*a*, and the polymer film 31*a* have notches which are the same in shape at the respective upper ends thereof, so that the upper end of the gel film 35 can touch a buffer solution in the upper buffer solution tank 5 through those notches.

The heat-retaining water tank 4 constituted by the side-surface frames 12 and 13 and a back-surface plate 15 utilizes a surface portion of the glass plate 21*a* as one of the side surfaces of the heat-retaining water tank 4. Water in the heat-retaining water tank 4 touches the surface of the glass plate 21*a* through an opening 11*a* of the front-surface frame 11, so that the temperature of the electrophoresis portion 20 is equalized so as to prevent the socalled "smiling" phenomenon from occurring in the electrophoresis pattern. Gasketing 9 and 10 is attached to the circumferences of the upper-end notch portion and the opening 11*a* formed in the surface of the front-surface frame 11, respectively, so as to prevent the buffer solution and the water in the heat-retaining tank 4 from leaking from the contacting surface between the electrophoresis portion 20 and the front-surface frame 11.

Grooves 12*a* and 13*a* formed in the side-surface frames 12 and 13 at the lower ends thereof are engaged with pins 16*b* and 17*b* provided to the posts 16 and 17 at the lower outsides thereof respectively, and grooves 16*a* and 17*a* formed in the posts 16 and 17 at the upper ends thereof, respectively are engaged with pinds 12*b* and 13*b* provided on the side-surface frames 12 and 13 at the upper insides thereof respectively, so that the side-surface frames 12 and 13 are engaged with the posts 16 and 17, respectively. The upper buffer solution tank 5 and the heat-retaining water tank 4, which are thus integrated with the side-surface frames 12 and 13, are fixed on the support 1.

Figure 3A:
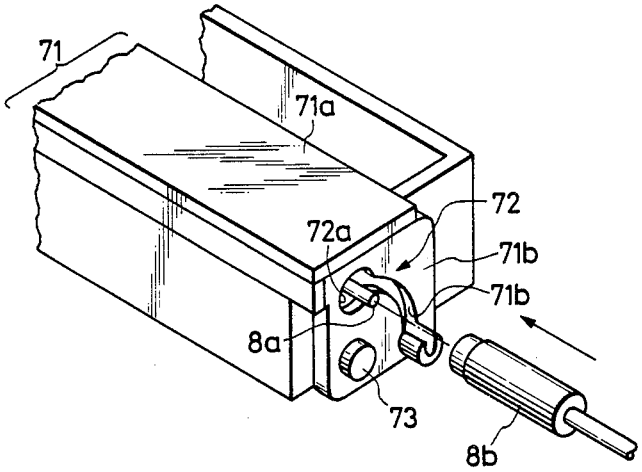
FIGS. 3*a* and 3*b*, and FIGS. 4*a* and 4*b* are perspective views showing safety covers respectively.
Figure 3B:
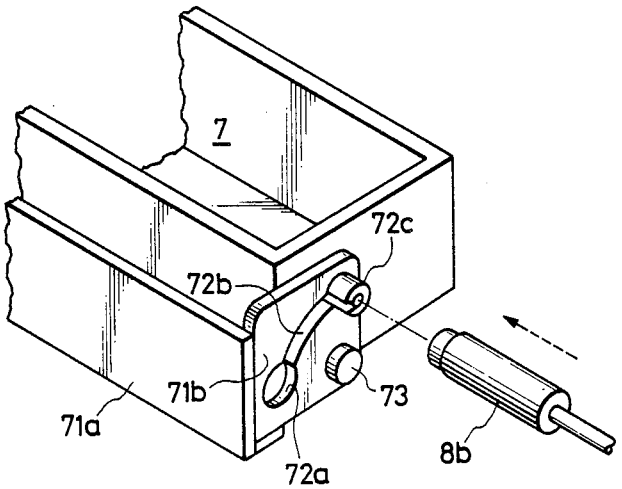

A lower safety cover 71 and an upper safety cover 51 are provided on the lower buffer solution tank 7 and on the upper buffer solution tank 5, respectively. The main portions of the lower buffer solution tank and the lower safety cover are shown in FIGS. 3*a* and 3*b*, respectively. FIGS. 3*a* and 3*b* show a state in which the buffer solution tank is covered with the safety cover and a state in which the safety cover has been taken off, respectively. In FIGS. 3*a* and 3*b*, the reference numeral 71 designates the safety cover, 8*a* the banana tip, 8*b* an electric power supply plug, 71*a* a cover body, 71*b* a member for supporting side surfaces of the cover, 72 an opening portion formed in the side surface of the supporting member, 72*a* a hole which the plug can penetrate, 72*b* an arcuate slit which only the banana tip can penetrate, 72*c* a member for protecting the banana tip, and 73 a shaft for supporting the safety cover. In FIG. 3*a*, the banana tip 8*a* is at a center of the hole 72*a*, so that the power supply plug 8*b* can be passed through the hole 72*a* so as to be connected to the banana tip 8*a*. In FIG. 3*b*, the safety cover has been taken off and at that time the banana tip 8*a* is positioned at the end of the arcuate slit 72*b* distal from hole 72*a* so as to be covered with the protecting member 72*c*, and so that the power supply plug 8*b* cannot be connected to the banana tip 8*a*.

Figure 4A:
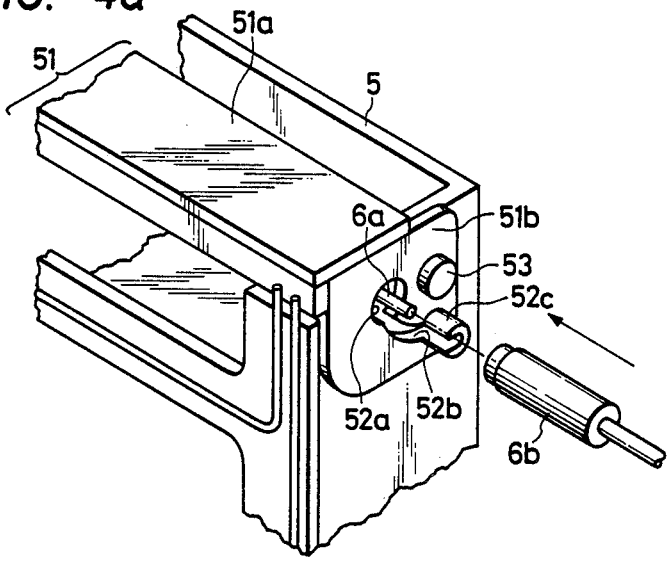
Figure 4B:
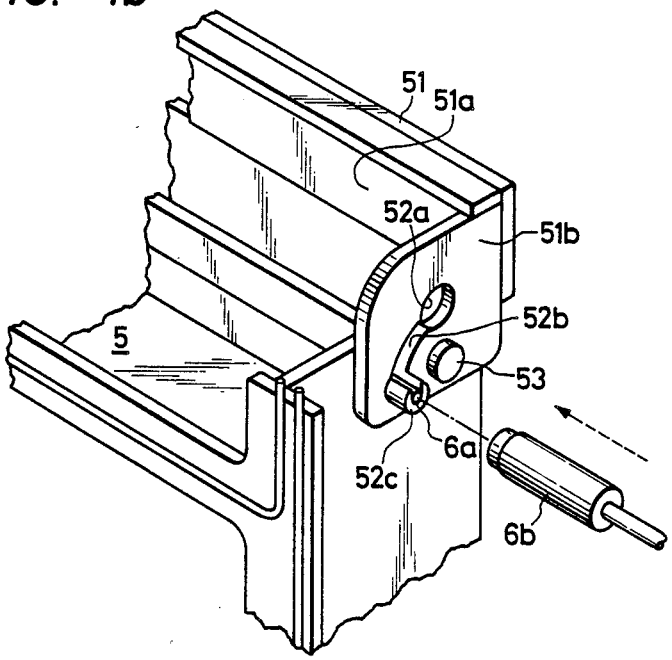

The main portions of the upper buffer solution tank and the upper safety cover are shown in FIGS. 4*a* and 4*b*, respectively. FIGS. 4*a* and 4*b* show the positions in which the buffer solution tank is covered with the safety cover, i.e., the closed position, and in which the safety cover has been taken off, i.e., the open position. In FIGS. 4*a* and 4*b*, the reference numeral 51 designates the safety cover, 6*a* the banana tip, 6*b* an electric power supply plug, 51*a* a cover body, 51*b* a member for supporting side surfaces of the cover, 52 an opening portion formed in the side surface supporting member, 52*a* a hole which the plug can penetrate, 52*b* an arcuate slit which only the banana tip can penetrate, 52*c* a member for protecting the banana tip, and 73 a shaft for supporting the safety cover. In FIG. 4*a*, the banana tip 6*a* can be passed through the hole 52*a* so as to be connected to the banana tip 6*a*. In FIG. 4*b*, the safety cover has been taken off and at that time the banana tip 6*a* is positioned at an end of the thin slit 52*b* so as to be covered with the protecting member 52*c*, so that the power supply plug 6*b* cannot be connected to the banana tip 6*a*.

Figure 6A:
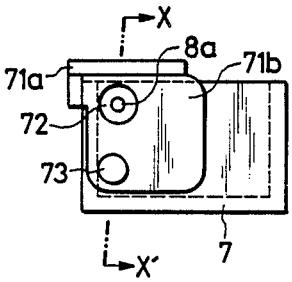
FIGS. 6*a* and 6*b* are elevational views of another embodiment.
Figure 6C:
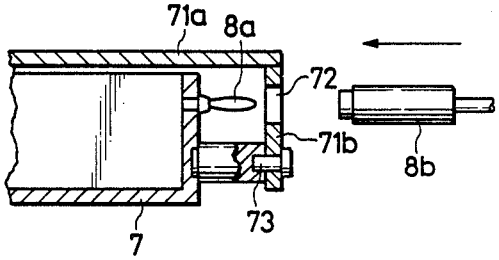
FIGS. 6*c* and 6*d* are cross-sections of 6*a* and 6*b* along the lines X—X', respectively.
Figure 6B:
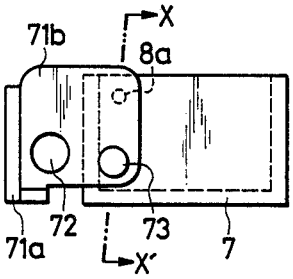
Figure 6D:
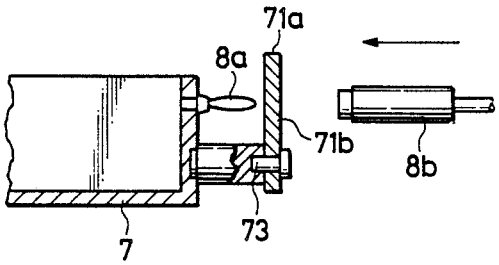

FIGS. 6*a*, 6*b*, 6*c*, and 6*d* show another embodiment of the present invention. FIG. 6*a* is an elevational view showing a state in which a buffer solution tank is covered with a safety cover; FIG. 6*b* is an elevational view showing a state in which the safety cover is taken off from the buffer solution tank; FIG. 6*c* is a cross-section taken on line X—X′ of FIG. 6*a*; and FIG. 6*c* is a cross-section taken on line X—X″ of FIG. 6*b*. In FIGS. 6*a* and 6*b*, the reference numeral 7 designates the buffer solution tank, 71 the safety cover, 8*a* the banana tip, 8*b* an electric power supply plug, 71*a* a cover body, 71*b* a member for supporting side surfaces of the cover, 72 a hole which the power supply plug can penetrate, and 73 a shaft for supporting the safety cover. In FIG. 6*a*, the buffer solution tank is covered with the safety cover and the banana tip 8*a* is at a center of the hole 72, so that the power supply plug 8*b* can be passed through the hole 72 so as to be connected to the banana tip 8*a*. In FIG. 6*b*, the safety cover has been taken off and at that time the banana tip 8*a* is covered with the side-surface supporting member 71*b*, so that the power supply plug 8*b* cannot be connected to the banana tip 8*a*.

As shown with the present invention, an electrophoresis apparatus is provided wherein electric shock due to carelessness can be prevented simply and surely without any significant increase in size of the apparatus. Further because the buffer solution tank must be covered to electrically activate the electrophoresis apparatus of the invention, the buffer solution tank of the apparatus is always covered with the covering member as long as the apparatus is in use. Therefore, the electrophoresis apparatus of the invention is also useful in preventing radioactive hazards due to radioactive labelled compounds used in electrophoresis as in the case of determination of a DNA base arrangement, because the buffer solution containing radioactive substances is shielded by the covering member.

What is claimed is:

1. In an electrophoresis apparatus having a buffer solution vessel provided with an electrode and an electrically conductive terminal, said buffer solution vessel having a cover member capable of covering said vessel so that an operator's hands cannot touch a buffer solution within said vessel, wherein the improvement comprises said cover member being provided with an opening through which a power supply plug can be connected to said electrically conductive terminal, said cover member being pivotally connected to the vessel for rotational movement between an open position wherein the vessel is uncovered and a closed position wherein the vessel is covered, said power supply plug being arranged so as to be able to be connected to said electrically conductive terminal through said opening only when said cover member is in said closed position.

2. An electrophoresis apparatus according to claim 1 wherein said opening is a hole formed through said cover member in the direction parallel or substantially parallel to the rotary axis of said cover member, the hole diameter being sufficiently large for a power plug to pass therethrough.

3. An electrophoresis apparatus according to claim 2 wherein the cover member has an arcuate slit extending from the hole, the width of the slit being sufficiently small to prevent the power supply plug from passing therethrough.

4. An electrophoresis apparatus according to claim 3 wherein the cover member has a projection located at the end of the slit distal from the hole for preventing connection of the power supply plug to the terminal when said cover member is in the open position.

5. An electrophoresis apparatus according to claim 1 wherein said opening is formed through said cover member in the direction perpendicular or substantially perpendicular to the rotary axis of said cover member, the hole diameter being sufficiently large for a power plug to pass therethrough.

* * * * *